Oct. 14, 1930.
M. B. SPRIGG
1,778,611
HOOK AND FASTENER
Filed Nov. 3, 1928
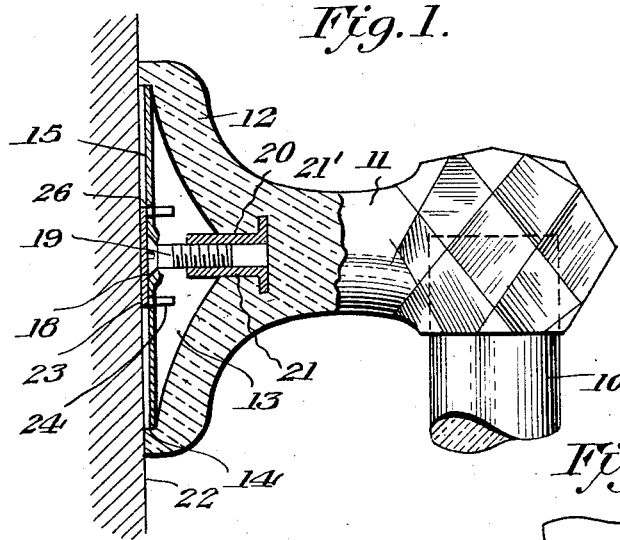
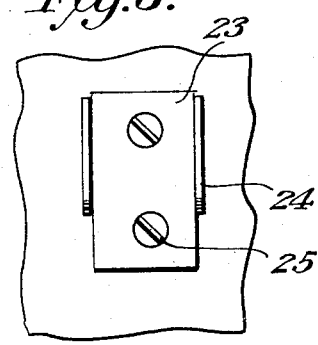
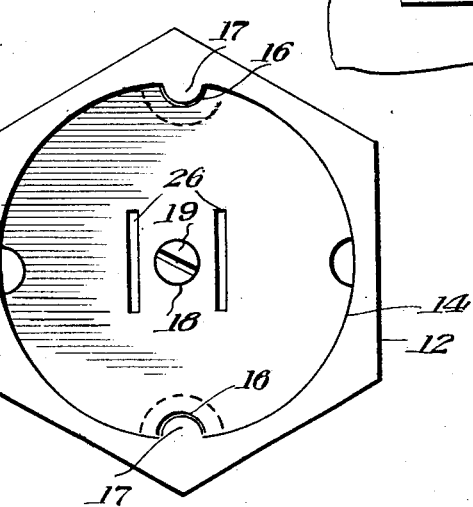
M.B.Sprigg INVENTOR
BY Victor J. Evans
ATTORNEY Patented Oct. 14, 1930

1,778,611

UNITED STATES PATENT OFFICE

MELVIN B. SPRIGG, OF WESTON, WEST VIRGINIA

HOOK AND FASTENER

Application filed November 3, 1928. Serial No. 316,960.

This invention relates to attaching devices and has for an object the provision of means for securing various articles to a wall or other support, the invention being especially designed for attaching bath room fixtures in position.

Another object of the invention is the provision of means of the above character wherein the attaching means is concealed.

Another object of the invention is the provision of a fixture attaching means, which in addition to the above and other advantageous features, is simple and cheap in construction, may be adjusted to allow for inequalities of wall surface, and which will also permit of the ready removal and replacement of the fixture should occasion arise.

With the above and other objects in view, the invention further includes the following novel features and details of construction, to be hereinafter more fully described, illustrated in the accompanying drawings and pointed out in the appended claims.

In the drawings:—

Figure 1 is a fragmentary view partly in top plan and partly in section, illustrating the invention.

Figure 2 is a rear elevation of the attached article showing the article carrying the plate in position.

Figure 3 is an elevation of the attaching member.

Figure 4 is a side view of the same.

Referring to the drawings in detail wherein like characters of reference denote corresponding parts, the invention is shown in connection with one end of a rod support, such as is ordinarily used for hanging towels and the like in bath rooms.

One end of this rod is connected at 10 and is supported in a socket provided in the outer end of an arm 11, the rod and arm being of any suitable or desired material.

Ordinarily, the base 12 of the arm is provided with openings for the passage of attaching screws, but one of the objects of the present invention is to eliminate these screws and to attach the arm in such a manner that the attaching means will be concealed. To accomplish this, the base 12 is provided with a socket 13 having a circumferentially extending shoulder 14, and seated against this shoulder is a plate 15. This plate is formed of sheet metal and is notched at diametrically opposite points 16 to receive lugs 17 which extend from the shoulder 14. The plate may thus be seated within the socket and held against rotation.

The plate 15 is provided with a central opening 18 for the passage of an attaching screw 19, and the socket 13 is formed with a central extension 20 which receives an internally threaded sleeve or plug 21, into which the screw is forced. This sleeve is provided with a head 21'. The screw 19 serves to secure the plate 15 in position and the head of the member 21' prevents the screw from pulling said member from the socket extension.

Secured to the wall or other support indicated at 22 is an anchoring member which includes an attaching plate 23 and fingers 24. The plate 23 is provided with spaced openings for the reception of screws or other fastening devices 25, while the fingers 24 extend from opposite edge of the plate at right angles to the face of the latter and are so spaced from the plate as to pass through the spaced openings 26 provided in said plate and frictionally engage the same.

The anchoring member is preferably positioned with the fingers 24 extending vertically upward so that they may be past thru the slots 26 and when the arm 11 is forced downward the inner edges of these fingers will frictionally engage the inner face of the plate 15 and the fixture will be securely held in place.

By adjusting the screw 15, the plate may if desired be flexed slightly inward to increase frictional engagement with the fingers. Also, thru the adjustment provided by the screw 19, inequalities of the surface 22 may be compensated for.

The invention is susceptible of various changes in its form, proportions and minor details of construction and the right is herein reserved to make such changes as properly fall within the scope of the appended claims.

Having described the invention what is claimed is:

1. An attaching device comprising a plate adapted to be carried by an article to be attached and having spaced slots therein, an anchor member, means extending from the anchor member for passage thru the slots of the plate to frictionally engage said plate and adjustable means extending through the plate and engaging the article to hold the plate under tension and regulate such frictional engagement.

2. In combination, a fixture having a socket in one end, a plate fitting within the socket and having its central portion spaced from the bottom of the socket, said plate having spaced openings therein, a screw passing through the plate and engaging with the fixture to hold the plate in position, an anchor member, and means extending from the anchor member for passage through the slots to frictionally engage said plate.

In testimony whereof I affix my signature.

MELVIN B. SPRIGG.